United States Patent [19]
Millas

[11] Patent Number: 5,512,011
[45] Date of Patent: Apr. 30, 1996

[54] COVER PLATE HEADER TONGUE AND GROOVE GRINDING/POLISHING MACHINE

[75] Inventor: George S. Millas, Houston, Tex.

[73] Assignee: Hudson Products Corporation, Houston, Tex.

[21] Appl. No.: 330,771

[22] Filed: Oct. 28, 1994

[51] Int. Cl.[6] ............................................ B24B 19/00
[52] U.S. Cl. ............................................ 451/439; 29/33 R
[58] Field of Search ................................. 451/439, 440, 451/420, 424, 124, 150

[56] References Cited

U.S. PATENT DOCUMENTS

| | | | |
|---|---|---|---|
| 2,524,332 | 10/1950 | Sichel | 451/439 |
| 3,020,679 | 2/1962 | Hensley | 451/124 |
| 3,218,762 | 11/1965 | Renfroe | 451/440 |
| 4,162,565 | 7/1979 | Rubenzer | 451/439 |
| 4,777,707 | 10/1988 | Kirscher | 451/439 |
| 5,106,243 | 4/1992 | Hunt | 451/439 |

*Primary Examiner*—Bruce M. Kisliuk
*Assistant Examiner*—Andrew Weinberg
*Attorney, Agent, or Firm*—Robert J. Edwards; Michael L. Hoelter

[57] ABSTRACT

An apparatus for removing machine lines from the gasket groove in the flanges of a header box has a support plate mounted for linear movement on rails connected to the header box. The support carries a tool driver which can be pivoted below the support to bring a grinding or polishing tool, rotated by the tool driver, into and out of the groove for grinding and polishing away the machine lines in the groove as the support slides along the rail. This grinds and polishes the grooves while avoiding a wavy effect which was a disadvantage of using a hand-held grinder for the same purpose.

8 Claims, 1 Drawing Sheet

5,512,011

COVER PLATE HEADER TONGUE AND GROOVE GRINDING/POLISHING MACHINE

FIELD AND BACKGROUND OF THE INVENTION

The present invention relates, in general, to grinding and polishing machines, and in particular, to a new and useful apparatus which is specifically suited to the grinding and/or polishing of the gasket grooves in a cover plate header box.

FIG. 1 illustrates a conventional header box 10 which includes a U-shaped box portion 12 having sides connected to a pair of outwardly extending flanges 14. Each flange contains a row of bolt holes 16 and a gasket groove 18 designed to receive a gasket (not shown). Bolt holes 16 are used to accommodate bolts that squeeze a cover against the flanges 14 thereby forming a pressure seal at the gasket.

A milling or other cutting tool is used to form the gasket grooves 18. Due to the dimensions of the header box, the grooves for confining the gasket are manufactured with machine lines across the pressure boundary. These are shown at 20 in FIG. 2. These machine lines are a serious detriment to the pressure seal since they extend across the pressure gradient, between the high pressure region and the low pressure region to be separated by the header box. It is thus necessary to grind away and polish the gasket grooves 18, to eliminate the machine lines and any other imperfections in the surfaces of the groove.

It is known to use hand-held grinders for this purpose but this is time consuming and inaccurate. It produces wavy surfaces in the groove which also diminish the pressure seal. It is also not practical to machine the grooves in a different way. Currently, they are machined with mill cutters which leave the machine lines.

SUMMARY OF THE INVENTION

An object of the present invention is to use an existing grinder or polisher which can be powered by air or electricity for example, but provide a mounting structure for accurately positioning the grinding/polishing tool, for eliminating the machine lines and polishing the gasket groove and bottom walls.

A further object of the present invention is to provide an apparatus for removing machine lines from a gasket groove and a header box, comprising rails which are connected to the flanges of the header box and which slidably carry a support. A tool drive is mounted for movement to the support and carries a tool positioned so that it can be accurately moved into and out of the groove for grinding and/or polishing the bottom and walls of the groove.

A further object of the present invention is to provide an apparatus for removing machines lines from the gasket groove of a header box which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
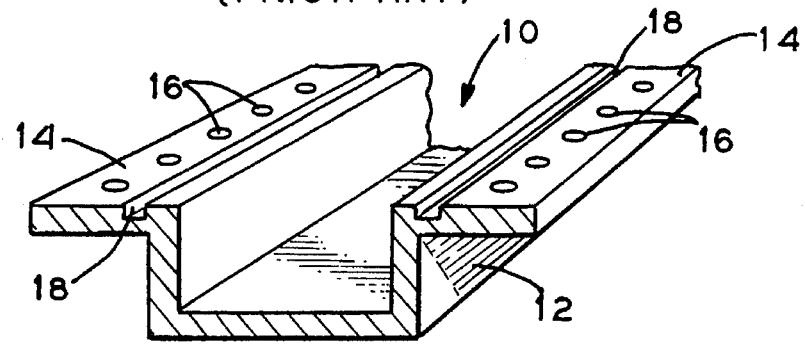
FIG. 1 is a partial perspective view of a known header box.
Figure 2:
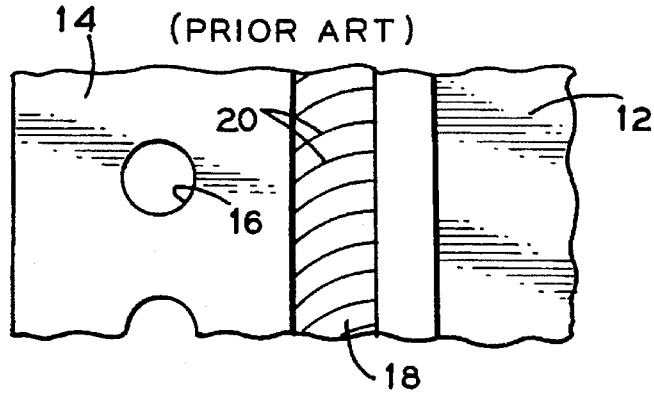
FIG. 2 is a partial top plan view of a known header box.
Figure 3:
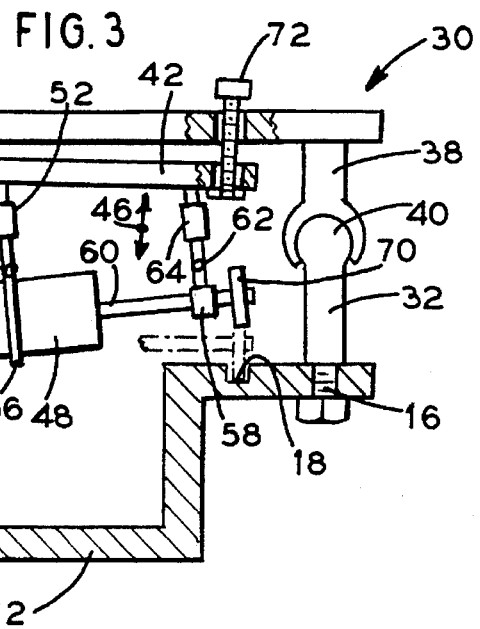
FIG. 3 is a side elevational view of the apparatus of the present invention in conjunction with a known header box.

Referring to FIG. 3, the present invention comprises an apparatus generally designated 30 for grinding and/or polishing the walls and bottom of the gasket grooves 18 in the flanges 14 of a header box 10. The apparatus comprises a pair of rails 32 which extend along a length of header box 10 and are fixed to flanges 14 by bolts 34 extending through pre-existing bolt holes 16 in flanges 14.

A top support plate 36 is slidably mounted along the length of rails 32 through downwardly extending ridges 38 engaged with linear bearings 40 to the top of rails 32. This produces smooth and accurate longitudinal movement of top support 36 across the top of header box 10.

A bottom support plate 42 is pivotally mounted at a hinge 44, to the lower surface of plate 36, for movement in the direction of double arrow 46 about hinge 44.

A tool driver such as an air, hydraulic or electric driven motor 48 is suspended from plate 42. This can be accomplished, for example, by an adjustable length member 50, such as a shaft with a turn buckle 52, connected by hinge 54 to band 56 around the housing of motor 48. A journal sleeve 58 engaged around shaft 60 of motor 48 is also shown here as being connected by a hinge 62 to an adjustable length member 64 and thence to plate 42. In this way, tool driver 48 can be suspended at a desired position and angle beneath plate 42. A grinding and/or polishing tool 70 is connected to and rotated by shaft 60 and is shaped for grinding and/or polishing the walls and/or bottom of gasket groove 18 on one of flanges 14. This tool 70 is designed to remove machine lines 20 and to further polish the various surfaces of groove 18. By adjusting the suspension of motor 48 below bottom plate 42, and by rotating an adjustment mechanism such as a threaded rod and coupling 72 for changing the angling of bottom plate 42 with respect to top plate 36, tool 70 can be raised from and brought down into groove 18 (see the phantom line position of tool 70 and tool shaft) for starting/ending a polishing operation. By moving the support made up of plates 36 and 42, along linear bearings 40, accurate and smooth polishing along the length of groove 18 can be achieved. Tool 70 would normally incorporate a grinding or a polishing wheel, but other wheels could be so mounted as desired.

Apparatus 30 can also be reversed or turned around for grinding and/or polishing the other groove 18 in opposite flange 14. If, before grinding/polishing other groove 18, tool 70 must also be horizontally re-positioned (in addition to the vertical adjustments described above), such can be accomplished either by simply adjusting the extension of shaft 60 with respect to motor 48 or, more drastically, member 50 can be supported from another position from plate 42. Other means of accomplishing such horizontal (and vertical) adjustment are also possible.

While a specific embodiment of the invention has been shown and described in detail to illustrate the application of the principles of the invention, it will be understood that the invention may be embodied otherwise without departing from such principles.

What is claimed is:

1. An apparatus for removing machine lines from a gasket groove in a header box having a flange containing the groove, the apparatus comprising:

(a) a rail connected to the flange and extending at least partly along the header box;

(b) a support comprising a top plate mounted for sliding along said rail and a bottom plate pivotally mounted with respect to said top plate;

(c) a tool driver connected to said support for driving a tool, said tool connected to said driver and positioned for movement along the groove to remove machine lines from the groove as said support moves along said rail; and, (d) adjustment means for adjusting said tool driver with respect to said support and for moving said tool into and removing said tool from engagement with the groove, said tool driver being connected to said bottom plate and said adjustment means comprising means for pivoting said bottom plate to a selected position with respect to said top plate for moving said tool into and out of engagement with the groove.

2. An apparatus according to claim 1, wherein the header box includes a pair of flanges with a said rail being connected to each flange, the apparatus further comprising linear bearings mounted between said rails and said top plate.

3. An apparatus according to claim 2, wherein each flange includes a row of bolt holes and wherein each said rail is connected to its respective flange through at least one of said bolt holes.

4. An apparatus for removing machine lines from a groove comprising:

(a) first and second rails extending generally parallel to each other and to the groove on opposites sides of the groove;

(b) a support platform slidably mounted upon said rails, said support platform comprising a rigid top plate and a bottom plate pivotally mounted thereto;

(c) drive means mounted to said bottom plate for driving a tool secured thereto;

(d) first adjustment means for adjusting the position of said bottom plate with respect to said top plate; and, (e) second adjustment means for adjusting the position of said drive means with respect to said bottom plate thereby selectively positioning said tool into and out of engagement with the groove.

5. The apparatus as set forth in claim 4 wherein said first and second adjustment means are separately and independently operable.

6. The apparatus as set forth in claim 5 wherein said first and second rails are secured on opposite sides of the groove via a series of bolt holes.

7. The apparatus as set forth in claim 6 wherein said bottom plate is pivotally secured to said top plate via a hinge and wherein said first adjustment means comprise a threaded fastener secured to said bottom plate opposite said hinge.

8. The apparatus as set forth in claim 6 wherein said second adjustment means comprise threaded fasteners intermediate said bottom plate and said drive means.

* * * * *